(12) United States Patent
Dang et al.

(10) Patent No.: US 7,332,454 B2
(45) Date of Patent: Feb. 19, 2008

(54) OXIDATION CATALYST ON A SUBSTRATE UTILIZED FOR THE PURIFICATION OF EXHAUST GASES

(75) Inventors: Zhongyuan Dang, Canton, MA (US); Yinyan Huang, Framingham, MA (US); Amiram Bar-Ilan, Brookline, MA (US)

(73) Assignee: Sud-Chemie Inc., Needham, MA (US)

( * ) Notice: Subject to any disclaimer, the term of this patent is extended or adjusted under 35 U.S.C. 154(b) by 356 days.

(21) Appl. No.: 11/082,087

(22) Filed: Mar. 16, 2005

(65) Prior Publication Data

US 2006/0211569 A1 Sep. 21, 2006

(51) Int. Cl.
*B01J 29/06* (2006.01)
*B01J 29/068* (2006.01)
*B01J 29/18* (2006.01)
*B01J 29/65* (2006.01)

(52) U.S. Cl. .......................... 502/60; 502/73; 502/74; 502/77; 502/78; 502/79

(58) Field of Classification Search ................. 502/60, 502/73, 74, 77, 78, 79
See application file for complete search history.

(56) References Cited

U.S. PATENT DOCUMENTS

| | | | |
|---|---|---|---|
| 4,189,404 A | 2/1980 | Keith | |
| 4,303,552 A | 12/1981 | Ernest | |
| 4,426,320 A | 1/1984 | Ernest | |
| 4,477,417 A | 10/1984 | Domesle | |
| 4,478,797 A | 10/1984 | Diwell | |
| 4,510,265 A | 4/1985 | Hartwig | |
| 4,749,671 A | 6/1988 | Saito | |
| 4,912,082 A | 3/1990 | Upchurch | |
| 5,075,274 A | 12/1991 | Kiyohide | |
| 5,202,299 A | 4/1993 | Symons | |
| 5,254,797 A | 10/1993 | Imoto | |
| 5,496,788 A | 3/1996 | Domesle | |
| 5,614,453 A * | 3/1997 | Occelli | 502/66 |
| 5,628,975 A | 5/1997 | Horiuchi | |
| 5,665,322 A | 9/1997 | Kiyohide | |
| 5,866,498 A | 2/1999 | Chattha | |
| 5,876,680 A | 3/1999 | Chattha | |
| 6,114,268 A * | 9/2000 | Wu et al. | 502/74 |
| 6,132,694 A | 10/2000 | Wood | |
| 6,248,684 B1 | 6/2001 | Yavuz | |
| 6,274,107 B1 | 8/2001 | Yavuz | |
| 6,399,035 B1 | 6/2002 | Tabata | |
| 6,613,299 B2 | 9/2003 | Dang | |
| 6,756,337 B2 | 6/2004 | Nakanishi | |

FOREIGN PATENT DOCUMENTS

| | | |
|---|---|---|
| EP | 1 075 870 | 2/2001 |
| WO | WO 96/40419 | 12/1996 |

* cited by examiner

*Primary Examiner*—Elizabeth D. Wood
(74) *Attorney, Agent, or Firm*—Scott R. Cox

(57) ABSTRACT

An oxidation catalyst deposited on a filter substrate for the removal of CO, hydrocarbons, and particulate matter, such as soot, from an exhaust stream wherein the oxidation catalyst is formed from a platinum group metal supported on a refractory oxide, tin oxide, and a zeolite.

23 Claims, 5 Drawing Sheets

OXIDATION CATALYST ON A SUBSTRATE UTILIZED FOR THE PURIFICATION OF EXHAUST GASES

CROSS REFERENCE TO RELATED APPLICATIONS

NONE

BACKGROUND OF INVENTION

This invention relates to an oxidation catalyst deposited on a substrate for the removal of CO, hydrocarbons and particulate matter from an exhaust stream, particularly a diesel engine exhaust stream, and a process for its use. The invention particularly relates to an oxidation catalyst deposited on a substrate, wherein the oxidation catalyst includes a platinum group metal supported on a refractory oxide, tin oxide, particularly large particle size tin oxide, and a zeolite. The invention more particularly relates to the above-referenced oxidation catalyst deposited on a substrate, wherein the refractory oxide is modified by blending it with a rare earth metal oxide.

Diesel engine exhaust emissions often include incomplete combustion products, such as hydrocarbons, particulate matter, CO, nitrogen oxides, and sulfur oxides. The particulate matter is generally a combination of condensed heavy hydrocarbons from unburned fuels and lubricants, carbon soot and sulfuric acid. As a result of the presence of these components, emissions from diesel engines can create serious air pollution which has a negative impact on human health. Accordingly, it is important that these pollutants from diesel engine exhaust emissions be trapped and/or converted into harmless compounds.

Such exhaust gas pollutants are commonly trapped by filtration with a heat-resistant exhaust gas filter, such as a ceramic foam, wire mesh, metal foam or a wall-flow type ceramic honeycomb filter. These filters capture the fine, carbon-based particles and can be regenerated by burning the accumulated carbon particles by use of a burner or the like when pressure drop within the system occurs. Alternatively, these filter can be produced from a heat resistant, gas filter structure whereby both the filtration operation and the regeneration treatment are performed at the same time and thus, no separate regeneration step is necessary.

These exhaust gas filters are generally coated with a catalytic material which tends to oxidize components of the exhaust stream. A common active component for these catalysts is a platinum group metal, such as platinum, palladium and/or rhodium. Such metals are preferred because of their high hydrocarbon oxidation activity at relatively low temperatures.

The platinum group metal component is often supported on a refractory inorganic oxide material, such as alumina, silica, titania, and zirconia.

Other catalytically active materials may be incorporated with the platinum group metals on the exhaust gas filter including compounds containing elements from the group of vanadium, iron, cobalt, nickel, molybdenum, tungsten, niobium, zinc, tin, copper, chromium, manganese, cerium, lanthanum, silver, barium, magnesium, calcium, strontium, potassium, sodium, cesium, and rubidium. In one example coated diesel particulate filters utilizing a combination of metals comprising a platinum group metal and a silver vanadate, are disclosed in U.S. Pat. Nos. 4,510,265 and 4,477,417.

U.S. Pat. No. 4,749,671 teaches an exhaust gas catalyst composition composed of a refractory, three-dimensional structure with a catalytically active substance secured thereto. The catalyst is designed to treat CO, hydrocarbons and fine carbonaceous particles in an exhaust gas from an automobile engine, particularly a diesel engine, at lower temperatures. The refractory, three-dimensional structure taught is selected from a ceramic foam, an open-flow ceramic honeycomb, a wall-flow honeycomb monolithic body, a metal honeycomb or a metal foam.

U.S. Pat. No. 5,628,975 teaches a method for purifying exhaust gases from a diesel engine by passing the exhaust gases through a honeycomb catalyst of specified geometry. This honeycomb catalyst comprises a flow-through metal or ceramic honeycomb carrier having 250 cells per square inch parallel to the direction of flow of the exhaust gases and at least one catalytically active component deposited thereon, selected from the group consisting of platinum, palladium, rhodium, iridium, vanadium, molybdenum, copper, silver, gold, rare earth elements and partially substituted perovskite composite oxides having an oxygen vacancy. Optionally, at least one refractory inorganic oxide, selected from the group consisting of alumina, silica, titania, zirconia, and zeolite, can also be added.

Although these systems have been useful for the treatment of diesel exhaust emissions in the past, there is still a need for an improved system for the removal and/or oxidation of hydrocarbons, particulate matter, such as soot, and CO.

It is therefore an object of the invention to disclose an improved oxidation catalyst deposited on a substrate utilized for the purification of exhaust gases, particularly diesel engine exhaust emissions.

These and other objects can be obtained by the catalyst deposited on a substrate, process for the preparation of the catalyst and catalyst substrate, and process for the use of the catalyst and catalyst substrate for the purification of exhaust gases, particularly diesel engine exhaust gas streams of the invention.

SUMMARY OF THE INVENTION

The present invention is an oxidation catalyst deposited on a substrate for the removal of CO, hydrocarbons, and particulate matter from an exhaust stream, particularly a diesel engine exhaust stream, wherein the oxidation catalyst comprises a platinum group metal supported on a refractory oxide; tin oxide; and a zeolite. Preferably, the tin oxide is large particle size tin oxide. Preferably, the refractory oxide is activated by blending it with a rare earth metal oxide. Preferably, the substrate is a honeycomb structure or a monolithic structure. Preferably, the platinum group metal is not secured within the voids or "cages" within the zeolite structural framework.

The present invention is also a process for the preparation of an oxidation catalyst supported on a substrate for the removal of CO, hydrocarbons and particulate matter from an exhaust stream, preferably a diesel engine exhaust stream, comprising preparing and blending an aqueous mixture of a refractory oxide, tin oxide and a zeolite; coating the substrate with the blended mixture; drying and calcining the coated substrate; depositing a platinum group metal precursor material on the calcined coated substrate, and calcining the platinum group metal coated substrate. Alternatively, the platinum group metal can be blended with the other components and deposited on the substrate in a single process step. Preferably the refractory metal oxide is modified by addition of a rare earth metal oxide to the aqueous mixture.

DETAILED DESCRIPTION OF A PREFERRED EMBODIMENT

Figure 1:
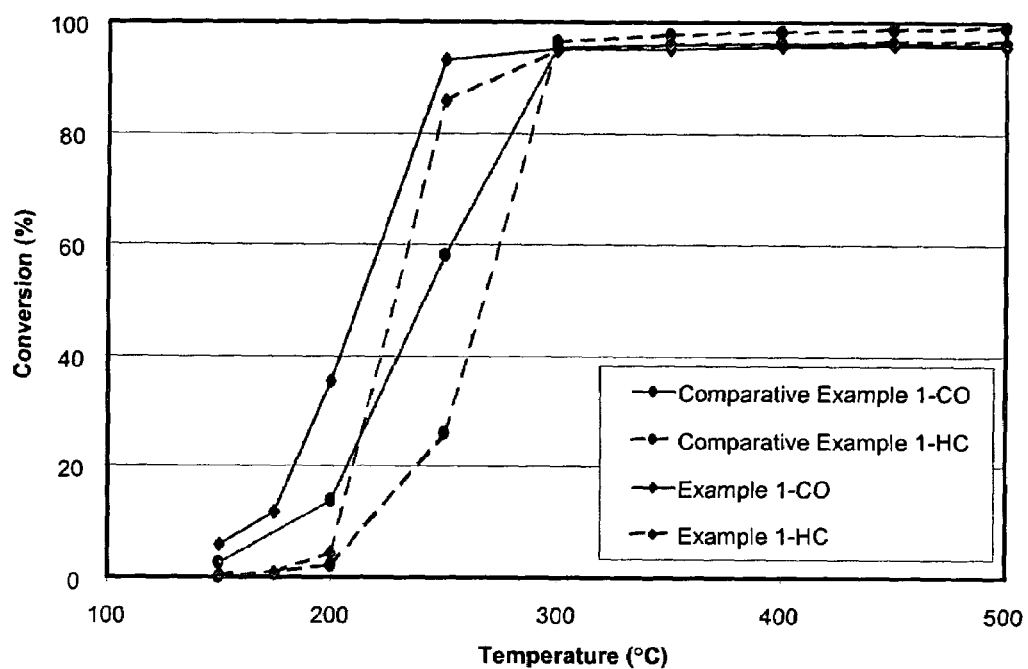
FIG. 1 is a graph comparing the removal of CO and hydrocarbons over a temperature range for the catalysts of Example 1 & Comparative Example 1.

This invention relates to a catalyzed particulate matter exhaust filter for filtration of a diesel engine exhaust stream. In particular, the invention relates to an oxidation catalyst deposited upon a substrate to oxidize CO, hydrocarbons and filter carbon materials, such as soot, from a diesel engine exhaust stream. In the practice of the invention, the oxidation catalyst, after deposition on a substrate, is placed in a filter housing mounted in an exhaust gas handling system of a diesel engine. The filter and filter housing, along with any other gas line elements which may be present, are placed between the exhaust gas manifold of the engine and the end of the exhaust pipe, which pipe is open to the atmosphere. Preferably, the filter is placed as close as possible to the engine exhaust manifold so that the exhaust gases, which are heated to high temperature by the exhaust manifold, can be used to burn off filtered particulate matter trapped by the filter and thus continuously regenerate the filter.

The invention is comprised of a porous filter substrate for filtering diesel particulate matter from the exhaust stream, which has deposited thereon a catalytic material, preferably an oxidation catalyst. The porous filter substrate is a conventional filtering product, such as a thin, porous, walled honeycomb, monolith or foam structure through which the exhaust gases pass to be filtered. Preferably, the filter substrate has significant flow-through capacity so as not to prevent or restrict significantly the flow of exhaust gases through the filter substrate. However, it must also contain sufficiently convoluted passageways to cause the particulate matter, which is present in the diesel engine exhaust gas, to drop out of the exhaust gas system and be retained by the filter substrate. The filter substrate may be produced from ceramic filter materials, such as alumina, titania, zirconia, boria, corundum, silica, magnesia, potassium-titanate, silica-alumina, silica-zirconia, titania-zirconia, titania-silica, silicon carbide, titania-coated alumina, alumina-coated tungsten oxide, alumina-coated with zirconia, ceramic cordierite, mullite and mixtures or combinations thereof. Alternatively, metallic or metallic alloy substrates, such as those produced from stainless steel, iron-chromium alloys, nickel-chromium-iron alloys with or with aluminum, and other such metallic substrates may be used. Preferred substrates are formed from commercially available cordierite, mullite, silicon carbide, iron-chromium alloys and stainless steel materials.

The porous filter substrate is coated with the oxidation catalyst. The oxidation catalyst is formed from a platinum group metal supported on a refractory oxide, tin oxide, and a zeolite. Preferably, the refractory oxide is activated with a rare earth metal oxide.

An important component of the oxidation catalyst is the platinum group metal component supported on the refractory oxide. The platinum group metal is selected from the group consisting of platinum, palladium, rhodium, ruthenium, rhenium and osmium. The preferred platinum group metals are platinum, palladium and rhodium and the most preferred is platinum.

The platinum group metal precursor materials, which are supported on the refractory oxide, are preferably selected from the group consisting of platinum sulfite acid, ammonium platinum sulfite, dihydrogen hexahydroxyplatinate, hydrogen tetranitroplatinate, hydrogen dinitrosulphatopalladate, hydrogen tetranitropalladate, hydrogen hexanitrorhodate, and other such similar compounds and mixtures thereof. The preferred platinum compounds produce negative ions when blended in an aqueous solution. For example, when platinum sulfite acid $[H_6Pt(SO_3)_4]$ is blended in an aqueous solution, a negative ion, $[Pt(SO_3)_4]^{6-}$ is produced. The presence of such negative platinum group ions reduces the likelihood that the platinum group metal ion will enter the "cages" of the zeolite structure, as discussed later.

The platinum group metal component is typically supported on a high surface area refractory oxide. Generally the surface area of the refractory oxide is at least about 75 $m^2/g$, preferably from about 100 to about 300 $m^2/g$, with a total pore volume of at least about 0.4 $cc^3/g$, preferably from about 0.5 to about 2.0 $cc^3/g$. The surface area and the pore volume referred to are determined by a nitrogen physisorption method.

The refractory oxide chosen as the support is preferably selected from oxides of one or more metals of Groups II, III and IV, including alumina, silica, titania, zirconia, silica-alumina, alumina-zirconia, alumina-titania, silica-titania, silica-zirconia, titania-zirconia. The preferred refractory oxides are selected from alumina, titania and zirconia, most preferably alumina.

In order to enhance the capability of the refractory oxide to receive the platinum group metal, preferably the refractory oxide is modified by treatment with a rare earth oxide, preferably selected from lanthanum oxide, tungstic oxide, cerium oxide, and yttrium oxide, preferably lanthanum oxide.

An additional component of the oxidation catalyst which is deposited upon the substrate is tin oxide. Tin oxide is especially useful for the oxidation of CO & various hydrocarbon materials. Tin oxide particularly has high activity for the oxidation of carbon (soot) from engine exhaust. Tin oxide also has significant oxygen storage capacity and can generate active oxygen for the oxidation of carbon. By using tin oxide the quantity of platinum group metal can be decreased while still achieving the same level of oxidation activity. Commercially available tin oxides typically are made from a chloride precursors and contain small quantities of chloride that have a negative impact on the performance of the catalyst of the invention. Calcination at a high temperature eliminates these chloride impurities. Such high temperature calcination also produces tin oxide having a larger particle size. Larger particle size tin oxide particles are believed to have higher activity for the oxidation of CO & hydrocarbons and are preferred for the catalyst of the invention. While conventional tin oxide particles range in size from about 1 to about 20 micrometers, in order to assist in the oxidation of the materials from the diesel engine exhaust stream, it is preferable that the tin oxide be added in the form of particles with a size from about 30 micrometers to about 100 micrometers. To produce tin oxide particles with a large particle size, conventional tin oxide particles with size from about 1 micrometer to about 20 micrometers are precalcined at a temperature from about 600° C. to about 1000° C. for 6 to 12 hours. Preferably, the tin oxide is calcined at a temperature of at least about 800° C. for at least about 8 hours. This precalcination also stabilizes the large particle size tin oxide particles and eliminates impurities, such as chlorides.

An additional component of the oxidation catalyst is the zeolite. Zeolites are known to trap hydrocarbons during a cold start period. The trapped hydrocarbons are then released when the light off temperature of the catalyst is achieved. In addition, zeolites are useful for the cracking of high molecular weight hydrocarbon molecules, thereby enhancing the activity of the oxidation catalyst for hydrocarbon removal efficiency. Various zeolites can be used with the oxidation catalyst including ZSM-5, Beta, mordenite, Y-zeolite, and ferrorite with a Si/Al ratio from about 10 to about 250. Preferably the zeolite is selected from ZSM-5, Beta and Y-zeolite. The $H^+$ form of the zeolite is preferred for high hydrocarbon adsorption capacity and high hydrocarbon cracking activity.

To produce a better catalyst it is preferable that the platinum group metal not be contained within voids or "cages" within the zeolite structural framework. Instead, the platinum group metals should be located on the surface of the refractory oxide. In order to achieve this result, it is important that appropriate preparation procedures be followed. Zeolite frameworks are generally electrically negative and are balanced by a positive cation, such as $H^+$, $Na^+$ or $K^+$. Ion exchange is the typical procedure used to make various metal-zeolite materials often resulting in the metal ion being present inside the zeolite cages. In contrast, when the platinum group metal compounds, such as those described above, are added to a solution containing zeolites, the platinum group metal ions tend to stay on the surface of the zeolite structure and not enter the voids therein because of the negative charge of the ions in an aqueous solution. These platinum compounds also have strong affinity for the refractory oxide, such as alumina. Thus, when a negatively charged platinum group metal ion is impregnated into a mixture containing a negatively charged zeolite and a refractory oxide, such as alumina, the platinum group metal preferentially attaches to the surface of the refractory oxide, preferable alumina, and is generally not contained within the voids or "cages" of the zeolite framework.

The oxidation catalyst of the invention contains at least one platinum group metal compound supported on a refractory oxide, preferably an activated refractory oxide, tin oxide, preferably large particle size tin oxide, and at least one zeolite. The concentration of the platinum group metal, by weight, is from 0.01% to 20 wt. % of the oxidation catalyst, preferably from about 0.1% to about 5 wt. %. The concentration of the refractory oxide is from about 5% to about 90% by weight of the oxidation catalyst, preferably from about 20% to about 80%. The concentration of the tin oxide is from about 5% to about 80%, preferably 20% to about 80%. The concentration of the zeolite is from about 10% to about 80%, by weight.

Depositing the catalyst material on the walls of the filter substrate, such as a honeycomb or monolithic structure, can be carried out by several processes. In a preferred process the oxidation catalyst is washcoated onto the filter substrate. During the washcoating process, the refractory oxide, zeolite and rare earth oxide, if one is utilized, are mixed together to form a slurry. The slurry preferably also contains a binder material. Preferable binder materials include colloidal alumina, colloidal silica, titania, zirconia, and ceria. The percentage of the binder in the slurry is preferably in the range of 1-20%, by weight. Following the mixing of the components in the aqueous solution, the composition is preferably milled for a period of time from 1 to 48 hours to achieve a consistent composition to obtain the desired slurry. The filter substrate is then coated with the slurry and any extra slurry is removed by air knifing or vacuum suction. After removing the extra slurry, the coated substrate is dried at a temperature of about 100° C. to 150° C. for about 2 hours followed by calcining at a temperature from about 500° C. to about 600° C. for about 3 hours to secure the material to the substrate.

Following impregnation of the filter substrate with the mixture of materials, the platinum group metal component is then impregnated onto the coated filter substrate. In one preferred embodiment, this impregnation process is accomplished by bringing the coated filter substrate into contact with an aqueous solution of the platinum group metal salt using an incipient wetness impregnation process. For example, when the platinum group metal chosen is platinum, one preferred salt is platinum sulfite acid. The filter element is coated with the platinum group metal salt in an aqueous solution. It is then dried at a temperature from about 100° C. to 150° C. and calcined at about 500° C. to about 600° C. for about 3 hours.

The formation of the oxidation catalyst on the filter substrate can also be accomplished in a one step deposition and calcination process. In this process, the platinum group metal compound is added to the slurry of alumina, tin oxide, zeolite and binder, if one is chosen, followed by milling, coating, drying and calcination steps.

Once the filter substrate is coated with the oxidation catalyst and calcined, it is placed in the exhaust flow of diesel engine for oxidative removal of CO, hydrocarbons and carbon compounds, such as soot.

The catalyst of the invention has high activity for soot oxidation when coated on a wall flow particulate filter and utilized in a diesel engine exhaust. The measured balance point temperature is below 300° C. In comparison, there is no thermal regeneration up to 500° C. on a bare filter substrate without catalyst coating.

The current catalyst coating also exhibits high CO, hydrocarbon ("HC") oxidation activity. Testing of the catalyst on diesel engine exhaust systems also shows high CO, HC and PM oxidation. As coated onto a conventional wall flow filter, the catalyst has much lower balance point temperature, compared with a conventional catalyst coating and filter substrate without coating.

EXAMPLES

The invention is further illustrated by the following examples:

Example 1

A washcoat slurry is prepared by mixing 1200 g La-doped alumina having 9.4% lanthanum oxide, 720 g tin oxide pre-calcined at 800° C. for 8 hours and 480 g H-beta-zeolite with a silica to alumina ratio of 25 in 3 liters of water, followed by milling the mixture for 20 hours. A ceramic honeycomb substrate supplied by Corning having a diameter of 1.75", a length of 2", and a cell density of about 400 cpsi is dipped into the washcoat slurry. Extra slurry is blown out using an air-knife. The coated honeycomb is then dried at 125° C. for 2-3 hours and calcined at 550° C. for 3 hours. The resulting washcoat loading is 125 g/l platinum sulfite acid is deposited on the coated substrate by incipient wetness impregnation, followed by drying at 125° C. for 2-3 hours and calcination at 550° C. for 3 hours. The resulting platinum loading is 1.4 g/l.

The resulting catalyst is tested on a laboratory reactor. The testing gas composition contains 800 ppm CO; 250 ppm $C_3H_6$, 250 ppm $C_3H_8$, 400 ppm NO; 100 ppm $SO_2$; 6% $H_2O$ with the remaining portion being air. The test space velocity is 100,000 $h^{-1}$. The results are shown in FIG. 1. The results show that the catalyst is highly active for the oxidation of CO and HC.

After the testing, the catalyst is thermal-aged at 650° C. for 48 hours and tested again under the same conditions. There is no apparent catalyst deactivation after thermal aging.

Comparative Example 1

A commercial DOC catalyst with a formulation of $Pt/Al_2O_3$ is prepared with a washcoat loading of 125 g/l and a Pt loading of 1.4 g/l. The catalyst is tested under the same conditions as in Example 1. The testing gas composition contains 800 ppm CO; 250 ppm $C_3H_6$, 250 ppm $C_3H_8$, 400 ppm NO; 100 ppm $SO_2$; 6% $H_2O$ with the remaining portion being air. The test space velocity is 100,000 $h^{-1}$. The results are also shown in FIG. 1. In a comparison of the performance of the catalysts, the Example 1 catalyst exhibited better catalytic performance.

Example 2

The alumina/zeolite/tin oxide washcoat slurry prepared in Example 1 is used for the coating of SiC foam. The SiC foam substrates are 4.66" in diameter with a 1" length, and porosities of 30 ppi, 40 ppi and 50 ppi. During the coating process, the foams are dipped into the slurry and extra slurry is removed by vacuum suction or centrifuging. The coated substrates are then dried at 125° C. for 2-3 hours and calcined at 550° C. for 3 hours. The washcoat loading is 40 g/L.

Pt deposition is then carried out by impregnation, as described in Example 1, followed by drying at 125° C. for 2-3 hours and calcination at 550° C. for 3 hours. The Pt loading is 0.88 g/L.

The foam substrates are stacked in a stainless steel housing with increasing pore density and placed into the exhaust flow of the LPA2 diesel engine for testing. This device is also called a flow through trap (FTT) since it has about 40-70% soot filtration efficiency. The LPA2 diesel engine has 2 cylinders and a displacement of 0.73 Liter. The LPA2 diesel engine powers an electric generator. The rated power output is 5.5 kW at 1800 rpm. A load bank is used to apply load to the generator. Diesel fuel containing about 350 ppm sulfur is used for testing. The coated honeycomb catalyst produced above is canned in a stainless steel housing and placed in the exhaust flow of the engine for testing.

During testing, the load on the generator is increased in steps. As a result the engine exhaust temperature increases. The concentration of hydrocarbons, CO and $NO_x$ at both inlet and outlet of the catalyst is analyzed and the conversions are calculated. The PM ("particulate matter") measurement is carried out according to EPA method 5 and the PM sampling chamber temperature is maintained at 110° C. The testing results are summarized below:

| Temperature (° C.) | CO (%) | HC (%) | $NO_x$ (%) | PM (%) |
|---|---|---|---|---|
| 205 | 39.6 | 38.7 | 9.1 | 44.1 |
| 310 | 100 | 75 | 11.2 | 50.9 |
| 420 | 97.0 | 86.7 | 14.3 | 53.6 |

(Percentages are removal of selected compound)

Figure 2:
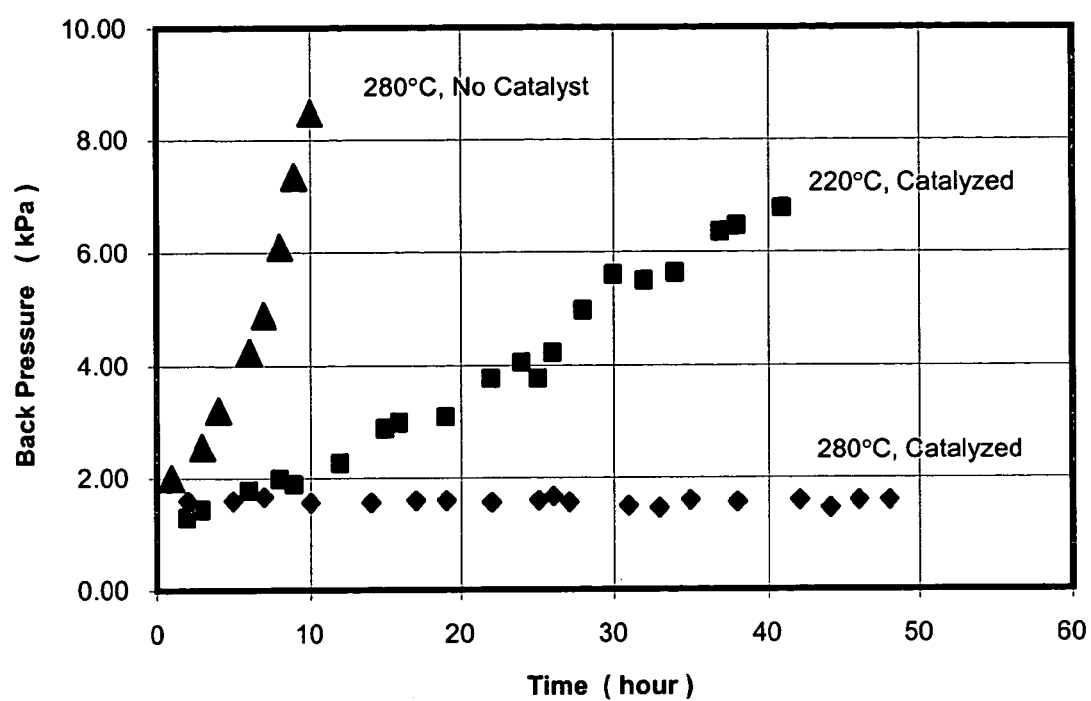
FIG. 2 is a graph comparing the back pressure buildup process with and without a catalyst on SiC foams at different temperatures, as discussed in Example 2.

The catalyst was also tested using a second procedure with the results shown in FIG. 2. With the fixed engine load and the exhaust temperature being constant, the pressure drop across the device is monitored with a soot loading process. At 220° C., the pressure drop across the device increases monotonously. At 280° C., there is no obvious backup pressure buildup. At 280° C., the same foam configuration without catalyst has quicker back pressure build up than the catalyzed device at 220° C. The results clearly indicate that the catalyst of the invention is highly active for PM oxidation removal and continuous regeneration of filter is achieved at 280° C.

Example 3

The alumina/zeolite/tin oxide washcoat slurry prepared in Example 1 is used for the coating of a conventional cordierite wall flow filter of 4.66" diameter by 6" length from Corning. The slurry is diluted and washcoated to the filter substrate followed by drying and calcination at 500° C. for 2-6 hours. The washcoating loading is 40 g/l. A Pt solution (platinum sulfite acid) is then deposited on the coated filtered substrate followed by drying and calcination at 500° C. The Pt loading is 1.77 g/l.

Figure 3:
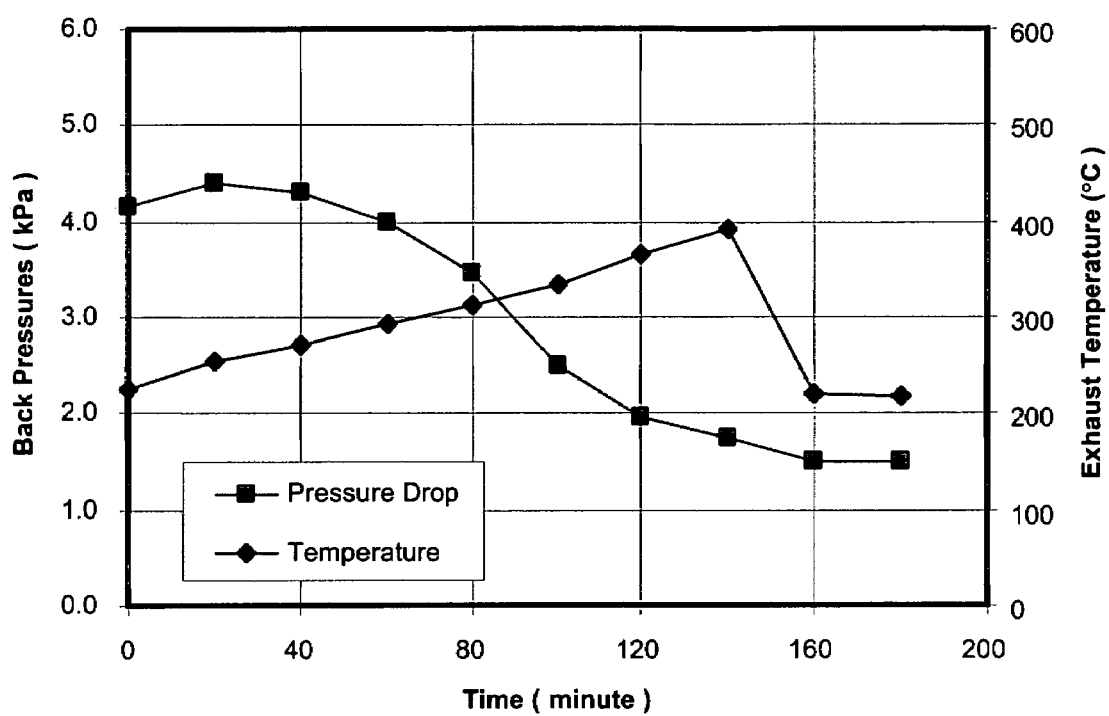
FIG. 3 is a graph showing a measurement of temperature vs. pressure drop over time for the catalyzed diesel particulate filter of Example 3.

The catalyzed particulate filter is tested on the LPA2 diesel engine powered generator as described in Example 2. The device is first loaded with soot at low temperature. Then the exhaust temperature is increased gradually. The back pressure across the device is monitored. The back pressure across the device increases with time and then decreases at a certain point. The point where the back pressure starts to decrease is called the "balance point temperature." As shown in FIG. 3, the balance point temperature of the current catalyst is 290° C.

Comparative Example 2

Figure 4:
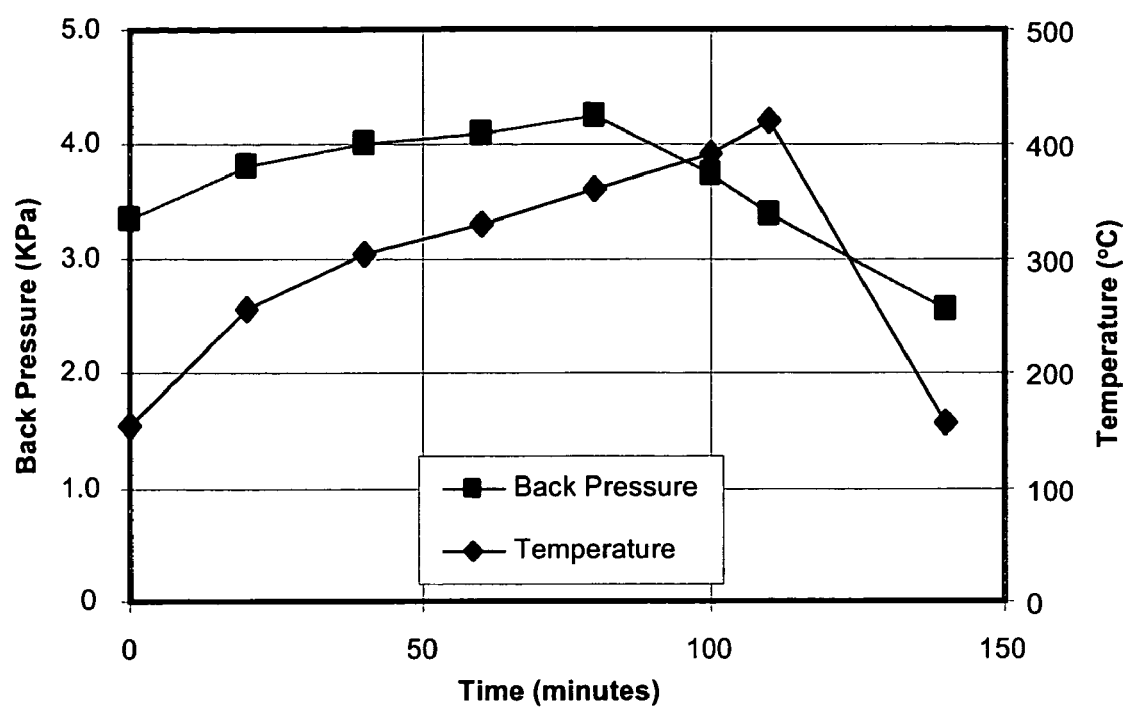
FIG. 4 is a graph showing a measurement of temperature versus pressure drop over time for the catalyzed diesel particulate filter of Comparative Example 2.

A catalyst formulation of $Pt/Mg/V/TiO_2$ as disclosed in the US patent application 2004/0116285 is prepared. A catalyzed particulate filter is prepared following the process described in the application and tested on the LPA2 diesel engine powered generator. Under the same conditions as in Example 2, the measured balance point temperature is 350° C. The results are shown in FIG. 4.

Figure 5:
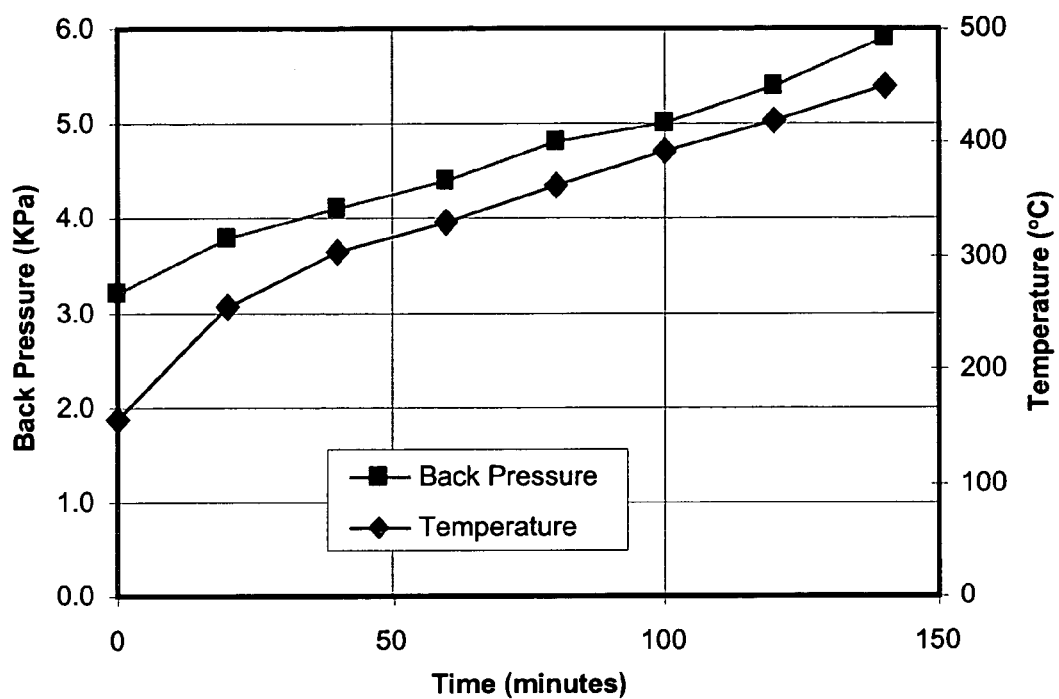
FIG. 5 is a graph showing a measurement of temperature versus pressure drop over time for the blank particulate filter substrate of Comparative Example 3.

A filter substrate without any catalyst coating is also tested on LPA diesel engine powered generator under the same conditions for balance point temperature measurement. No regeneration occurs up to the high engine loading or exhaust temperature (>500° C.). The results are shown in FIG. 5.

It is understood that modifications, substitutions and changes of the specific embodiments may be made without departing from the scope of the invention.

The invention claimed is:

1. An oxidation catalyst deposited on a substrate, for the removal of CO, hydrocarbons, and particulate matter from an exhaust stream, wherein the oxidation catalyst comprises a platinum group metal supported on the following components:
a refractory oxide;
tin oxide; and
a zeolite,
wherein the refractory oxide comprises at least 5% of the oxidation catalyst and wherein the tin oxide comprises at least about 5% of the oxidation catalyst.

2. The oxidation catalyst of claim 1 wherein the platinum group metal is selected from the group consisting of platinum, palladium, rhodium and mixtures thereof.

3. The oxidation catalyst of claim 1 wherein a precursor material for the platinum group metal produces negative ions when blended in an aqueous solution.

4. The oxidation catalyst of claim 1 wherein a precursor material for the platinum group metal is selected from the group consisting of platinum sulfite acid, ammonium platinum sulfite, dihydrogen hexahydroxyplatinate, hydrogen tetranitroplatinate, hydrogen dinitrosulphatopalladate, hydrogen tetranitropalladate, hydrogen hexanitrorhodate, and mixtures thereof.

5. The oxidation catalyst of claim 1 wherein the zeolite is selected from the group consisting of ZSM-5, beta-zeolite, mordenite, Y-zeolite, ferrierite and mixtures thereof.

6. The oxidation catalyst of claim 1 wherein the platinum group metal is substantially not secured within cages of the zeolite structure.

7. The oxidation catalyst of claim 1 wherein the refractory oxide is selected from the group consisting of alumina, silica, titania, zirconia, silica-alumina, alumina- zirconia, alumina-titania, silica-titania, silica-zirconia, titania-zirconia and mixtures thereof.

8. The oxidation catalyst of claim 1 wherein the refractory oxide is modified by blending with a material selected from rare earth metal oxides, tungstic oxide and mixtures thereof.

9. The oxidation catalyst of claim 8 wherein the rare earth metal oxide is selected from lanthanum oxide, cerium oxide, yttrium oxide and mixtures thereof.

10. The oxidation catalyst of claim 1 wherein the refractory oxide comprises a lanthanum oxide activated alumina.

11. The oxidation catalyst of claim 1 wherein the tin oxide is precalcinated at a temperature from about 600 C to about 1000 C prior to formation of the oxidation catalyst.

12. The oxidation catalyst of claim 1 wherein the tin oxide substantially comprises tin oxide particles with a particle size from 30-100 micrometers.

13. The oxidation catalyst of claim 1 wherein the substrate comprises a honeycomb or a monolithic structure.

14. The oxidation catalyst of claim 1 wherein the substrate is produced from the group consisting of cordierite, mullite, iron-chromium alloy and stainless steel.

15. The oxidation catalyst of claim 1 wherein the platinum group metal comprises from about 0.01 to about 20 percent by weight of the oxidation catalyst.

16. The oxidation catalyst of claim 1 wherein the zeolite comprises from about 10% to about 80%, by weight of the oxidation catalyst.

17. The catalyst of claim 1 wherein the refractory metal oxide comprises from about 5 to about 90 percent by weight of the oxidation catalyst.

18. The oxidation catalyst of claim 1 wherein tin oxide comprises 5 to about 80 percent by weight of the oxidation catalyst.

19. An oxidation catalyst deposited on a substrate, for the removal of CO, hydrocarbons and particulate matter from a diesel exhaust stream, wherein the oxidation catalyst comprises
a platinum group metal supported on the following components:
a refractory oxide, wherein the refractory oxide is modified by blending with a rare earth oxide;
tin oxide with a particle size from 30-100 micrometers; and
a zeolite,
wherein the refractory oxide comprises at least 5% of the oxidation catalyst and wherein the tin oxide comprises at least about 5% of the oxidation catalyst.

20. A process for the production of an oxidation catalyst deposited on a substrate for the removal of CO, hydrocarbons and particulate matter from an exhaust stream comprising
preparing an aqueous mixture of a refractory oxide, tin oxide and a zeolite;
blending the mixture;
coating a substrate with the blended mixture;
drying and calcining the coated substrate;
depositing a platinum group metal precursor material on the calcined coated substrate; and
calcining the platinum group metal coated substrate, wherein the refractory oxide comprises at least 5% of the oxidation catalyst and wherein the tin oxide comprises at least about 5% of the oxidation catalyst.

21. The process of claim 20 wherein the aqueous mixture is blended with a binder selected from the group consisting of colloidal alumina, colloidal silica, titania, zirconia, ceria and mixtures thereof.

22. A process for the production of an oxidation catalyst deposited on a substrate for the removal of CO, hydrocarbons and particulate matter from an exhaust stream comprising
preparing an aqueous mixture of a refractory oxide, tin oxide with a particle size from 30-100 micrometers, zeolite and a platinum group metal precursor material;
blending the mixture;
coating a substrate with a blended mixture; and
drying and calcining the coated substrate,
wherein the refractory oxide comprises at least 5% of the oxidation catalyst and wherein the tin oxide comprises at least about 5% of the oxidation catalyst.

23. The process of claim 22 wherein the aqueous mixture is blended with a binder selected from the group consisting of colloidal alumina, colloidal silica, titania, zirconia ceria and mixtures thereof.

* * * * *